United States Patent

Perego

Patent Number: 5,835,082
Date of Patent: Nov. 10, 1998

[54] VIDEO REFRESH COMPRESSION

[75] Inventor: Richard E. Perego, Boulder, Colo.

[73] Assignee: National Semiconductor, Santa Clara, Calif.

[21] Appl. No.: 863,123

[22] Filed: May 27, 1997

Related U.S. Application Data

[63] Continuation of Ser. No. 364,911, Dec. 27, 1994, abandoned.

[51] Int. Cl.⁶ ........................................... G09G 5/00
[52] U.S. Cl. ............................. 345/202; 345/507
[58] Field of Search ................... 345/118, 119, 345/202, 116, 507, 516, 203; 364/232, 233

[56] References Cited

U.S. PATENT DOCUMENTS

| | | | |
|---|---|---|---|
| 4,020,462 | 4/1977 | Morrin, II | 345/202 |
| 4,074,254 | 2/1978 | Belser et al. . | |
| 4,437,093 | 3/1984 | Bradley . | |
| 4,642,625 | 2/1987 | Tsunehiro et al. . | |
| 4,688,190 | 8/1987 | Bechtolsheim . | |
| 4,771,275 | 9/1988 | Sanders . | |
| 4,958,378 | 9/1990 | Bell | 345/118 |
| 5,109,520 | 4/1992 | Knierim . | |
| 5,128,658 | 7/1992 | Pappas et al. | 345/119 |
| 5,261,049 | 11/1993 | Lumelsky et al. | 345/191 |
| 5,274,753 | 12/1993 | Roskowski et al. | 345/116 |
| 5,295,235 | 3/1994 | Newman . | |
| 5,381,454 | 1/1995 | Nusinov et al. . | |
| 5,423,019 | 6/1995 | Lin . | |
| 5,450,544 | 9/1995 | Dixon et al. . | |
| 5,512,921 | 4/1996 | Mital et al. | 345/202 |

*Primary Examiner*—Steven J. Saras
*Assistant Examiner*—Xu-Ming Wu
*Attorney, Agent, or Firm*—Andrew S. Viger; John L. Maxin

[57] ABSTRACT

A data compression apparatus and method of displaying graphics in a computer system employs a full frame buffer and compressed frame buffer wherein pixel data is sent to a display device and concurrently compressed and captured in parallel so that subsequent unchanged frames are regenerated directly from the compressed frame buffer.

24 Claims, 2 Drawing Sheets

VIDEO REFRESH COMPRESSION

The present application is file wrapper continuation of application Ser. No. 08/364,911, filed Dec. 27, 1994, now abandoned.

BACKGROUND OF THE INVENTION

1. Field of the Invention

The invention relates generally to systems and methods of video display, and more particularly to systems and methods of pixel data compression in a computer system.

2. Description of Related Art

Without limiting the scope of the invention, this background information is provided in the context of a specific problem to which the invention has application.

Over the last decade, the quality of computer graphic displays has steadily increased with improvements in pixel resolution, color depth, and screen refresh rate of the display device—typically a cathode ray tube (CRT) or a liquid crystal display (LCD). It is commonplace for graphics in computers to have a frame resolution of up to 1280×1024 pixels and up to 16.7 million simultaneous colors. Display of such high resolution and high color content images, particularly at high refresh rates, places great demands on the memory subsystem which stores the frame buffer. Typically, tradeoffs are made to obtain suitable display rates and resolutions which the memory subsystem can supply while still having enough bandwidth to perform memory accesses required by the graphics engine or host central processing unit (CPU). If the display data rate is too high, the system is paralyzed by constant pixel data reads from memory—leaving no time for other tasks to access the memory.

To illustrate this point, a computer system employing an inexpensive graphics subsystem, for example a memory array with 32-bit wide DRAMs having a "fast-page" access of 45 nanoseconds, would have a theoretical peak available bandwidth of 89 megabytes/second. Realistically however, this value must be de-rated to account for, inter alia, page misses—imposing an available bandwidth of about 77 megabytes/second. With a frame resolution of 1024×768 pixels, eight color intensity bits per pixel, and a seventy-five Hz refresh rate, the required display bandwidth is 59 megabytes/second (1024×768×1 Byte×75)—seventy-seven percent of the total available memory bandwidth. If the color intensity resolution were increased to sixteen bits per pixel, the display bandwidth requirement would double to 118 megabytes/second—29 megabytes/second more than the peak available bandwidth.

One approach in confronting these limitations is to simply increase the bandwidth of the memory subsystem by using special purpose dual-ported memories or by increasing the width of the DRAM interface. Accordingly, several types of specialty graphics memory integrated circuits have spawned such as dual-ported VRAM or Windows™ RAM. These types of memories however, are not produced in as large of volumes as the ubiquitous DRAM used for main memory, thus command a price premium.

By way of further background, power consumption is yet another major concern in the design of graphic display subsystems, especially in portable computers due to their limited battery life. It is known that power consumption increases in proportion with consumed memory bandwidth and thus high resolution and high color content display modes traditionally have not been well suited for portable computer applications.

From the foregoing, it can be seen that there is a need for a system and method for high performance graphics display without increased power consumption.

SUMMARY OF THE INVENTION

To overcome the limitations of the prior art described above, and to overcome other limitations that will become apparent upon reading and understanding the present specification, a low power, reduced bandwidth, graphics display system and method is disclosed for generating pixel data utilizing full and compressed frame buffers. As pixel data is sent from the full frame buffer to a display device, it is concurrently compressed and captured in the compressed frame buffer so that subsequent unchanged frames are regenerated directly from the compressed frame buffer. Coherency is maintained between the full and compressed frame buffers with a dirty/valid tag RAM so that as the pixel data stream is transferred out and compressed, the compressed data is validated for subsequent frame updates from the compressed frame buffer.

Once the pixel data stream has been compressed, stored in the compressed frame buffer, and validated, on subsequent frames, the pixel data is retrieved directly from the compressed frame buffer and decompressed as it is sent to the display device. The pixel data is continuously retrieved as required to refresh the display from the compressed frame buffer until the compressed data elements are invalidated by future frame buffer writes. As new pixel data is rendered to the full frame buffer by a graphics engine or host CPU, the dirty tags for the corresponding compressed data elements are set so that during the next qualified frame scan, the pixel data is retrieved from the full frame buffer rather than the compressed frame buffer.

A feature of the present invention is separate dirty and valid bits to validate each compressed data element (preferably although not exclusively a raster line) in a frame and a programmable frame rate control mechanism to qualify the dirty bits. The dirty bits are set in response to pixel data being rendered to the full frame buffer. The valid bits are set in response to the data compressor updating a compressed data element in the compressed frame buffer. The programmable frame rate control mechanism provides a programmable sample rate to qualify the dirty bits so that updates to the full frame buffer are ignored for a predetermined period of time and more frame displays occur from the compressed frame buffer, thus lowering memory bandwidth and power consumption.

Another feature of the present invention is the ability to employ unified memory in a practical graphics system—providing easy upgradeability for either graphics or main memory with the addition of continuous DRAM.

These and various other objects, features, and advantages of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described specific examples of systems and methods practiced in accordance with the present invention.

DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. The detailed description is organized as follows:

1. Exemplary Refresh Compression System
2. Compression Command And Color Data Paths
3. Decompression Command and Color Data Paths
4. Conclusion This organizational outline, and the corresponding headings, are used in this Detailed Description for convenience of reference only. Detailed descriptions of conventional or known aspects of microprocessor and graphic display systems are omitted so as not to obscure the description of the invention with unnecessary detail. In particular, certain terminology relating to computer video display standards and operational modes are known to practitioners in the field of graphics display design.

1. Exemplary Refresh Compression System

Figure 1:
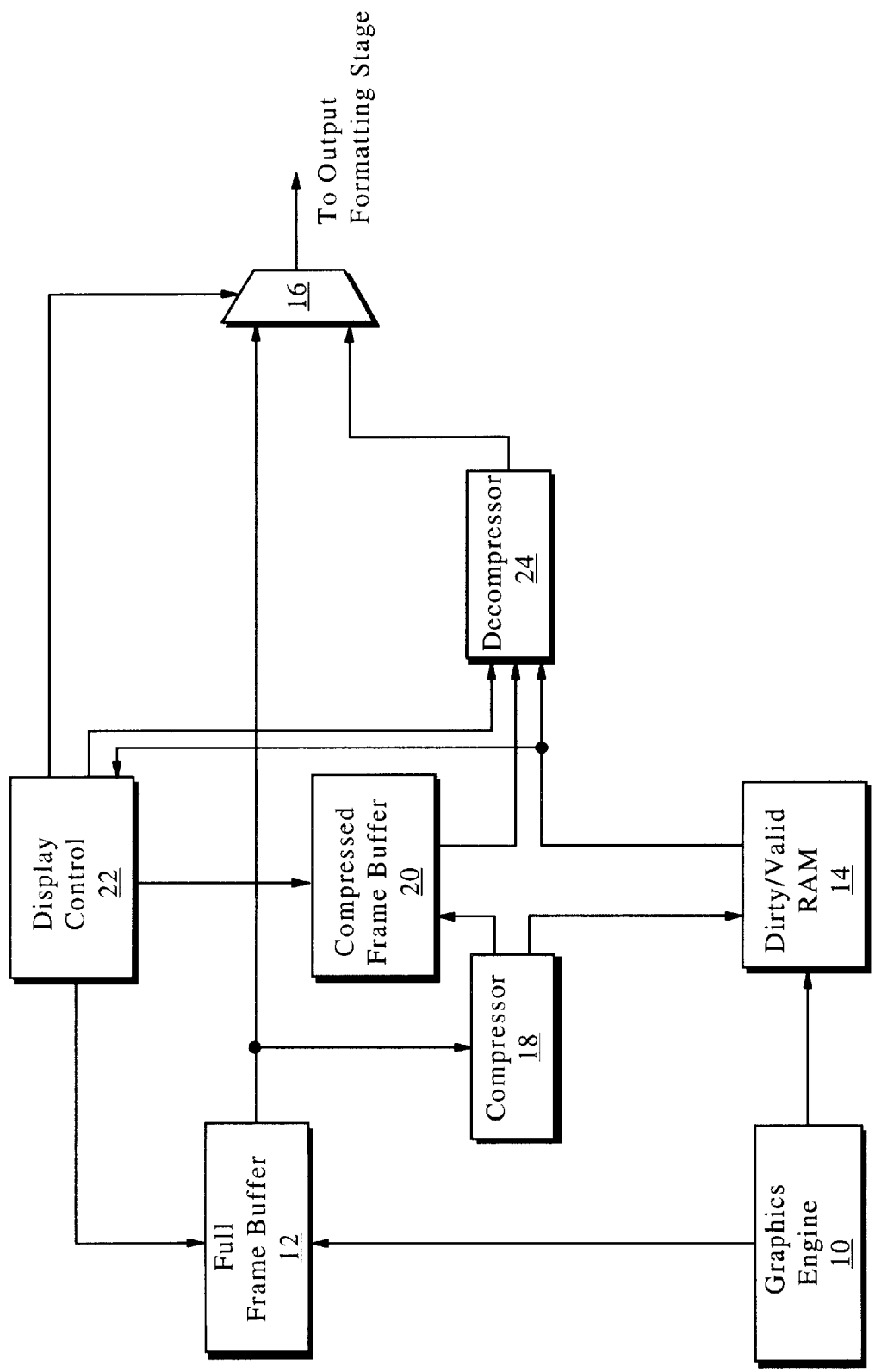
FIG. 1 is a block diagram depicting a video refresh compression system practiced in accordance with the principles of the present invention; and, FIG. 2 is a block diagram depicting the command and color data paths for the exemplary system in FIG. 1.

Referring now to FIG. 1, a block diagram depicts a video refresh compression system practiced in accordance with the principles of the present invention. A graphics engine 10 or CPU (depicted in FIG. 2 as CPU 13) updates a data element (preferably although not exclusively a raster line) in a full frame buffer 12 by writing (rendering) pixel data thereto and setting a corresponding dirty bit in a dirty/valid RAM 14 to indicate that the raster line has been updated. In the preferred embodiment, the full frame buffer 12 is variable in size but is preferably large enough to accommodate a frame resolution of 1280×1024 pixels or greater. With the aid of the present disclosure, those skilled in the art will recognize other frame resolutions, frame buffer sizes, number of frames stored in the frame buffer, and data element sizes without departing from the scope of the present invention.

The dirty/valid RAM 14 holds a dirty bit and a valid bit for each data element (raster line) stored in the full frame buffer 12—which in the preferred embodiment corresponds to 2048 (1024×2) bits. If the dirty bit in the dirty/valid RAM 14 indicates that a raster line has been updated, the full frame buffer 12, responsive to display control circuitry 22, updates the display device (except as described in more detail hereinbelow), by transferring a stream of pixel data corresponding to each raster line to an input on a two input multiplexer 16. The output of the multiplexer 16 is fed to the pixel output formatting stage (not shown) where a palette lookup is performed, if necessary, any overlays are inserted, and a flat panel (LCD) interface or a video palette digital-to-analog converter (DAC) (not shown) is driven which in turn drives a CRT (also not shown).

The stream of pixel data from the full frame buffer 12 is also coupled to a data compressor 18 which in the preferred embodiment, concurrently compresses and stores the pixel data in a compressed frame buffer 20 as it is received by the multiplexer 16. After a complete data element (raster line) is compressed and stored in the compressed frame buffer 20, the data compressor 18 validates the corresponding valid tag in the dirty/valid RAM 14. On subsequent frame refreshes by display control circuitry 22, compressed data elements whose valid bits are set and whose dirty bits are not set or not qualified, are supplied through a data decompressor 24 to the multiplexer 16. The data decompressor 24 decompresses the data and supplies it through the multiplexer 16 for output to the display device. The full frame buffer 12, the compressed frame buffer 20, and the dirty/valid RAM 14, may be physically located in the same DRAM array as main memory. Preferably however, the dirty/valid RAM 14 is located in a scratch pad RAM separate from main memory since fast rendering by the graphics engine 10 or CPU can quickly dirty large blocks of data.

The dirty bits in the dirty/valid RAM 14 need not be sampled at the frame refresh rate. Rather, a slower rate set by display control circuitry 22 can "qualify" changes in dirty bit status so that the decompressor 24 ignores updates made in the full frame buffer 12 for N frames. Since fluid motion is generally regarded as thirty frames per second, there is no need to update the displayed frame any faster. Moreover, in the case where the display device has an even slower response time, such as a passive flat panel (LCD) display, the frame update rate may be even lower.

For example, there is no need to update the display any faster than five frames per second for a display panel having a 200 millisecond response time. If the display control circuitry 22 supplies a refresh rate of 60 Hz, the qualifier frequency can be twelve times less so that the dirty bits are qualified once every twelve frames (5 Hz) to assure an image update rate equal to five frames per second. Therefore, assuming the entire image is compressible, with a twelve-to-one quality ratio, the display is updated from the compressed frame buffer 20 approximately ninety-two percent of the time, regardless of how fast new pixel data are rendered by the graphics engine 10 to the full frame buffer 12.

2. Compression Color and Control Data Paths

Figure 2:
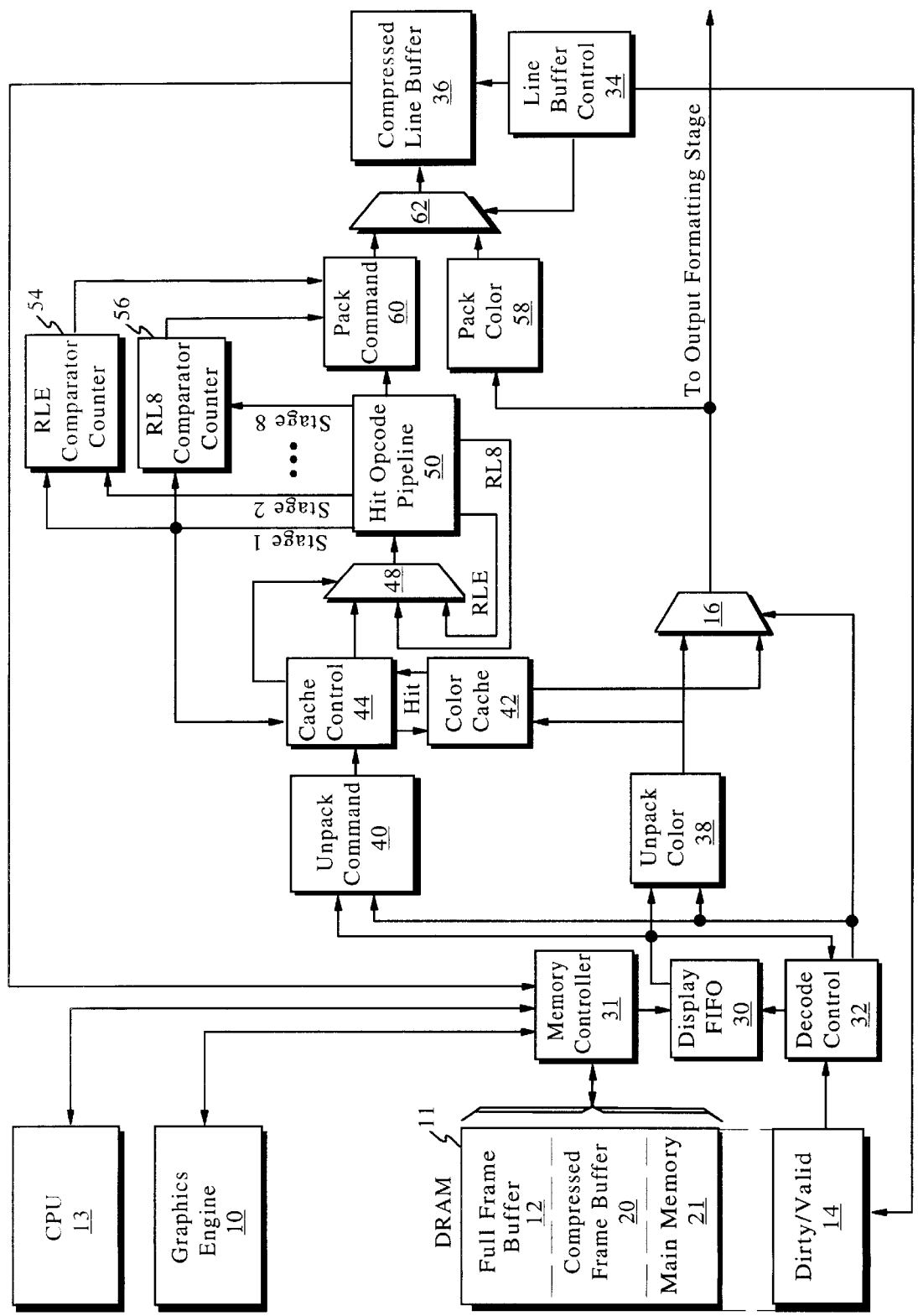

Reference is now made to FIG. 2 which depicts the preferred color and command data paths for a system practiced in accordance with the principles of the present invention. With the aid of the present disclosure, those skilled in the art will recognize other forms and number of stages for the color and command data paths without departing from the scope of the present invention. A display FIFO 30 is coupled via a memory controller 31, to a DRAM array 11 which includes the full frame buffer 12, the compressed frame buffer 20, and optionally main memory 21. Decode control circuitry 32 has a first input coupled to the dirty/valid RAM 14 and a first output for controlling the display FIFO 30 to load pixel data from the full frame buffer 12 when dirty bits are qualified and set or valid bits are not set Alternatively, the display FIFO 30 loads pixel data from the compressed frame buffer 20 when the valid bit is set and the dirty bit is not qualified or not set Decode control circuitry 32 has a second input coupled to the output of the display FIFO 30 for detecting and decoding a control word stored in the compressed frame buffer 20 (described in more detail hereinbelow) and a second output coupled to color unpack circuitry 38, command unpack circuitry 40, and multiplexer 16. The multiplexer 16 routes pixel data from the color unpack circuitry 38 if the pixel data originates from the full frame buffer 12 and from the color cache 42 (or the color unpack circuitry 38 in the case of a load new color instruction LNC), if the pixel data originates from the compressed frame buffer 20. The output of multiplexer 16 is coupled to the pixel output formatting stage (not shown) and to an input on color pack circuitry 58. Color data from the multiplexer 16 is concatenated "packed" to 32-bit boundaries by color pack circuitry 58.

Command pack circuitry 60 receives and concatenates variable length "hit opcodes" to 32-bit boundaries from hit opcode pipeline 50, RLE detector 54, and RL8 detector 56 (all described in more detail hereinbelow). The outputs of color pack circuitry 58 and command pack circuitry 60 are coupled to inputs on multiplexer 62. Line buffer control circuitry 34 controls multiplexer 62 to fill a compressed line buffer 36 with compressed color and command data at its opposite ends respectively, progressing towards the middle of the line buffer 36. If the line buffer 36 does not overflow by the time the end of the raster line is reached, line buffer control circuitry 34 writes the contents of the compressed line buffer 36 to the compressed frame buffer 20, interleaving the color and command data on 64-bit boundaries. A control word for each data element (raster line) is calculated by line buffer control circuitry 34 and is appended to the beginning of each compressed line buffer 36 entry to define the amount and the length of the command and color data. After the control word, each entry in the compressed frame buffer 20 contains command and color data alternating on 64-bit boundaries until one of the data streams terminates.

Although the temporal relationship between command and color data is lost due to the uneven pipelining between the command and color data paths, the interleaving of color and command data in the compressed frame buffer 20 presents data in the approximate required order when the raster line is loaded from the compressed frame buffer 20 into the display FIFO 30 on future refreshes. When the raster line has been successfully written back from the compressed line buffer 36 to the compressed frame buffer 20, the line buffer control circuitry 34 validates the corresponding valid bit in the dirty/valid RAM 14 for that raster line.

A color cache 42, which preferably includes a fully associative, three entry primary cache, a single entry, secondary "victim" cache, and a plurality of comparators, receives color data from the output of color unpack circuitry 38. It should be understood however, that with the aid of the present disclosure, those skilled in the art will recognize other cache configurations, associations, and sizes without departing from the scope of the present invention. Cache control circuitry 44, which is coupled to the color cache 42, tracks and replaces least-recently-used (LRU) entries in the primary cache when a new color is sent from the color unpack circuitry 38. If the new color hits in the secondary cache, the secondary cache entry is swapped with the LRU entry in the primary cache. When a new color is updated in the primary cache, the color previously in that position is moved to the secondary cache.

The color cache 42 signals a hit to the cache control circuitry 44 whenever color data from the color unpack circuitry 38 matches color data in the color cache 42. In response, the cache control circuitry 44 encodes and sends a "hit opcode" identifying the cache location of the hit to multiplexer 48. The output of multiplexer 48 is sent through the hit opcode pipeline 50.

In addition to the opcodes used for hits in the color cache 42, run-length encoding (RLE) opcodes are used to compress a series of constant colors greater than four. Separate opcode commands are used for short runs (five to nineteen) and long runs (twenty to two-hundred-fifty-five) to maximize compression. Constant color sequences less than five are encoded using a repeat cache opcode command. To efficiently handle raster lines containing a dithered background, a Repeat Last "N" (for example, N=eight) (RL8) opcode is used. As a raster line is sent to the pixel output formatting stage, if the next eight pixels match the previous eight pixels in the same order and provided that the group is not all the same color, the group of eight pixels is encoded with the RL8 opcode.

To avoid encoding repetitive opcodes, a "hit opcode pipeline" 50 is provided having a plurality of stages for pipelining hit opcodes from the multiplexer 48 so that RLE detector 54 and RL8 detector 56 can determine RLE and RL8 strings respectively. Since a stream of pixel data can be encoded as a series of hit opcodes in the color cache 42, as an RLE opcode, or possibly as an RL8 opcode, the hit opcode pipeline 50 provides a means for detectors 54 and 56 to compare, count, and most efficiently encode multiple adjacent hit opcodes. The number of stages in the hit opcode pipelines 50 is preferably eight However, those skilled in the art will recognize that the pipeline 50 can be contracted or expanded to accommodate other opcode strings. The hit opcode pipeline 50, RLE detector 54, and RL8 detector 56, drive the command pack circuitry 60 which packs the respective codes for the respective cache location or opcode strings, as described hereinabove.

If the current pixel color from the color unpack circuitry 38 does not match any of the colors in the color cache 42, the cache control circuitry 44 encodes a Load New Color (LNC) command opcode into the pixel data stream. The LNC opcode requires four bits in addition to the pixel data bits to describe the color value itself and thus results in data expansion rather than compression. The data expansion is not significant since the majority of the screen is repetitive and rarely requires a new color to be loaded.

The encoded opcodes for the exemplary embodiment are summarized below in Table 1.

TABLE 1

| OPCODE | NAME | DESCRIPTION | LENGTH (Bits) | ENCODED (Bits/Pixel) | COMPRESSION RATIO (8 Bits/Pixel) | COMPRESSION RATIO (16 Bits/Pixel) |
|---|---|---|---|---|---|---|
| 00 | RC0 | Repeat Cache 0 | 2 | 2 | 4:1 | 8:1 |
| 01 | RC1 | Repeat Cache 1 | 2 | 2 | 4:1 | 8:1 |
| 10 | RC2 | Repeat Cache 2 | 2 | 2 | 4:1 | 8:1 |
| 1100 | RC3 | Repeat Cache 3 | 4 | 4 | 2:1 | 4:1 |
| 1101 | RL8 | Repeat Last 8 | 4 | 0.5 | 16:1 | 32:1 |
| 1110 | RLE4 | RLE - 4-bit count | 8 | 0.42–1.6 | 5:1 to 19:1 | 10:1 to 38:1 |
| 1110 1111 | RLE8 | RLE - 8-bit count | 16 | 0.063–0.8 | 10:1 to 128:1 | 20:1 to 256:1 |
| 1111 | LNC | Load New Color | 12/20 | 12/20 | 0.67:1 | 0.8:1 |

3. Decompression Color and Command Data Path s

With reference still to FIG. 2, on refresh, if the valid bit is set and the dirty bit is not qualified or not set in the dirty/valid RAM 14 for the selected raster line, decode control circuitry 32 detects and decodes the control word stored in the compressed frame buffer 20. The control word identifies the length of the command and data streams and accordingly instructs the decode control circuitry 32 to control color unpack circuitry 38 and command unpack circuitry 40 to unpack the command and color data from the display FIFO 30. The color data from the color unpack circuitry 38 is cached in the color cache 42 while the command data is decoded by cache control circuitry 44. Responsive to the command data, cache control circuitry 44 selects one of three inputs to multiplexer 48. A first input is coupled to the cache control circuitry 44 which outputs a single opcode identifying a single cache location or a LNC opcode to load a new color. The second and third inputs of multiplexer 48 are coupled to the hit opcode pipeline 50 which feeds back repetitive run-length encoded (RLE) and repeat last eight (RL8) opcodes. The first stage of hit opcode pipeline 50 (which is the output of multiplexer 48 delayed by one clock cycle) is coupled back to cache control circuitry 44. Responsive to the opcode generated by the first stage in hit opcode pipeline 50, cache control circuitry 44 instructs the color cache 42 to send color data or to load new color data from the color unpack circuitry 38 into the multiplexer 16.

4. Conclusion

Although the Detailed Description of the invention has been directed to certain exemplary embodiments, various modifications of these embodiments, as well as alternative embodiments, will be suggested to those skilled in the art For example, specific register structures, mappings, bit assignments, cache associations and sizes, and other implementation details are set forth solely for purposes of providing a detailed description of the invention. However, the invention has general applicability to any computer system architecture. Various modifications based on trade-offs between hardware and software logic will be apparent to those skilled in the art. The invention encompasses any modifications or alternative embodiments that fall within the scope of the claims.

What is claimed is:

1. A video refresh compression system comprising:
   (a) rendering means for rendering pixel data to form at least one video frame wherein the video frame comprises a plurality of display data elements and each display data element comprises a plurality of pixel data, and wherein each of the plurality of display data elements are independently compressible with respect to each other;
   (b) a full frame buffer having an input coupled to receive and store the pixel data from the rendering means and an output for providing uncompressed display data elements;
   (c) a compressed frame buffer to store compressed display data elements having an input and an output;
   (d) a data compressor having an input coupled to the output from the full frame buffer to receive and compress display data elements and an output coupled to the input on the compressed frame buffer;
   (e) a data decompressor having an input coupled to the output from the compressed frame buffer and an output;
   (f) tag means having a plurality of valid bits settable responsive to the data compressor, for validating compressed display data elements stored in the compressed frame buffer;
   (g) display control circuitry, coupled and responsive to the tag means, to control sourcing of either uncompressed display data elements from the full frame buffer or compressed display data elements from the compressed frame buffer; and,
   (h) a multiplexer having a first input coupled to the output from the full frame buffer, a second input coupled to the output from the data decompressor, a control input coupled to the display control circuitry, and an output for providing display data elements from the first and second inputs to form the video frame.

2. A system as recited in claim 1 wherein the tag means further comprises a plurality of dirty bits settable responsive to the rendering means, for validating each compressed display data element and the display control circuitry is further responsive to the plurality of dirty bits.

3. A system as recited in claim 1 wherein the display control circuitry, is further coupled to the full frame buffer, to synchronize refresh of pixel data from the rendering means.

4. A system as recited in claim 3 further comprising (i) programmable frame rate control means, coupled to the display control circuitry and the tag means, for programming a rate that the plurality of dirty bits are qualified.

5. A system as recited in claim 1 wherein the full and compressed frame buffers reside in a unified memory.

6. A system as recited in claim 5 wherein the unified memory further comprises main memory.

7. A system as recited in claim 1 wherein the rendering means is a central processing unit.

8. A system as recited in claim 1 wherein the rendering means is a graphics engine.

9. A video refresh compression system comprising:
   (a) rendering means for rendering pixel data to form at least one video frame wherein the video frame comprises a plurality of display data elements and each display data element comprises a plurality of pixel data, and wherein each of the plurality of display data elements are independently compressible with respect to each other;
   (b) full frame buffer means, coupled to receive pixel data from the rendering means, for buffering and sourcing uncompressed display data elements;
   (c) compressed frame buffer means for buffering compressed display data elements;
   (d) data compressor means, coupled between the full frame buffer means and the compressed frame buffer means, for compressing the display data elements as the display data elements are sourced from the full frame buffer means and storing the display data elements in the compressed frame buffer means;
   (e) data decompressor means, coupled to the compressed frame buffer means, for decompressing the display data elements;
   (f) valid tag means, responsive to the data compressor means and including a valid bit for each compressed data element, for maintaining coherency between the full frame buffer means and the compressed frame buffer means;
   (g) display control means, coupled and responsive to the valid tag means, for controlling whether each display data element is sourced from either the full frame buffer means or the compressed frame buffer means; and,
   (h) multiplexer means, coupled to the full frame buffer means, the data compressor means, and the display control means, for outputting display data elements to form the video frame.

10. A system as recited in claim 9 wherein the valid tag means further comprises a dirty bit for each compressed display data element and wherein the dirty bit is controlled by the rendering means and the valid bit is controlled by the data compressor means.

11. A system as recited in claim 9 wherein the display control means is further coupled to the full frame buffer means, for synchronizing refresh of pixel data from the rendering means.

12. A system as recited in claim 11 further comprising (i) programmable frame rate control means, coupled to the display control means and the valid tag means, for programming a rate that the dirty bits are qualified.

13. A system as recited in claim 9 wherein the full and compressed frame buffer means reside in a unified memory.

14. A system as recited in claim 13 wherein the unified memory further comprises main memory.

15. A video refresh method wherein a video frame comprises a plurality of display data elements and each display data element comprises a plurality of pixel data, and wherein each of the plurality of display data elements are independently compressible with respect to each other, comprising the steps of:

(a) rendering pixel data to a full frame buffer;

(b) in response to display control circuitry, sending uncompressed display data elements from the full frame buffer to a display device;

(c) concurrently compressing the uncompressed display data elements as it is sent to the display device and storing the compressed display data elements in a compressed frame buffer;

(d) validating a plurality of valid bits corresponding to the plurality of compressed display data elements compressed in step (c);

(e) on subsequent updates by the display control circuitry, decompressing the compressed display data elements in the compressed frame buffer for each of the compressed display data elements having corresponding valid bits set valid; and, (f) sending to the display device the display data elements decompressed in step (e) and otherwise sending uncompressed display data elements from the full frame buffer as in step (b) to form a video frame.

16. A method as recited in claim 15 further comprising the step of (g) setting a dirty bit in a plurality of dirty bits as the pixel data is rendered to the full frame buffer in step (a).

17. A method as recited in claim 16 further comprising the step of (h) qualifying the plurality of dirty bits at a rate slower than a rate of sending the uncompressed display data elements from the full frame buffer to a display device in step (b).

18. A method as recited in claim 17 wherein step (f) further comprises a condition that the dirty bit is not set or not qualified.

19. A video refresh method wherein a video frame comprises a plurality of display data elements and each display data element comprises a plurality of pixel data, and wherein each of the plurality of display data elements are independently compressible with respect to each other, comprising steps of:

(a) associating a first tag and a second tag with each of the plurality of display data elements of the video frame;

(b) updating a display data element in a full frame buffer from a source of pixel data and setting the first tag of the display data element;

(c) clearing the first tag and the second tag associated with a display data element when that display data element is output from the full frame buffer, and for each display data element that is compressible, compressing and storing the compressed display data element in a compressed frame buffer and setting the associated second tag as each display data element that is compressible is output from the full frame buffer;

(d) outputting a display data element from the full frame buffer for video frame refresh if the associated first tag is set and the associated second tag is cleared; and, (e) outputting and decompressing a display data element from the compressed frame buffer for video frame refresh if the associated first tag is not set and the associated second tag is set.

20. A method as recited in claim 19 further comprising the step of qualifying display data elements every Nth frame wherein N is a number of frames and wherein step (e) is further conditioned on the associated first tag being not qualified.

21. A computer system comprising:

(a) a display for displaying video frames wherein each video frame comprises a plurality of display data elements and each display data element comprises a plurality of pixel data, and wherein each of the plurality of display data elements are independently compressible with respect to each;

(b) a processor that provides pixel data;

(c) a full frame buffer to store uncompressed display data elements having an input coupled to the processor to receive and store the pixel data and an output for providing the uncompressed display data elements;

(d) a compressed frame buffer to store compressed display data elements having an input and an output;

(e) a data compressor to compress display data elements having an input coupled to the output from the full frame buffer to receive and compress display data elements and an output coupled to the input on the compressed frame buffer;

(f) a data decompressor having an input coupled to the output from the compressed frame buffer and an output;

(g) a tag memory having a plurality of valid bits settable responsive to the data compressor, for validating each compressed display data element stored in the compressed frame buffer;

(h) display control circuitry, coupled and responsive to the tag memory, to control sourcing of either uncompressed display data elements from the full frame buffer or compressed display data elements from the compressed frame buffer; and, (i) a multiplexer having a first input coupled to the output from the full frame buffer, a second input coupled to the output from the data decompressor, a control input coupled to the display control circuitry, and an output responsive to the display control circuitry, for providing display data elements from the first and second inputs to form the video frame.

22. In a computer system having a display and a processor, a method of refreshing a video frame displayed on the display wherein the video frame comprises a plurality of display data elements and each display data element comprises a plurality of pixel data, and each of the plurality of display data elements are independently compressible with respect to each other, comprising steps of:

(a) providing pixel data from the processor to a full frame buffer;

(b) in response to display control circuitry, sending uncompressed display data elements from the full frame buffer to the display;

(c) compressing the uncompressed display data elements as it is sent to the display and storing the compressed display data elements in a compressed frame buffer;

(d) validating a plurality of valid bits corresponding to a plurality of compressed display data elements compressed in step (c); and, (e) so long as the valid bit corresponding to each compressed display data element is valid, on subsequent updates by the display control circuitry, decompressing the compressed display data elements in the compressed frame buffer and sending it to the display and otherwise sending uncompressed display data elements from the full frame buffer to refresh the video frame on the display.

23. A computer system comprising:

(a) a display;

(b) a processor that provides pixel data to form a video frame wherein the video frame comprises a plurality of display data elements and each display data element comprises a plurality of pixel data, and wherein each of the plurality of display data elements are independently compressible with respect to each other;

(c) a unified memory coupled to the processor and having an input and an output and including;
  (i) a full frame buffer to store uncompressed display data elements; and
  (ii) a compressed frame buffer to store compressed display data elements;

(d) a data compressor having an input coupled to the full frame buffer and an output coupled to the compressed frame buffer, to concurrently compress uncompressed display data elements as the uncompressed display data elements are sourced by the full frame buffer;

(e) a data decompressor having an input coupled to the output from the unified memory and an output to decompress compressed display data elements;

(f) a tag memory having a plurality of valid bits for validating each compressed display data element stored in the compressed frame buffer;

(g) display control circuitry coupled and responsive to the tag memory, to control sourcing of either uncompressed display data elements from the full frame buffer or compressed display data elements from the compressed frame buffer; and, (h) a multiplexer having a first input coupled to the unified memory, a second input coupled to the output from the data decompressor, a control input coupled to the display control circuitry, and an output responsive to the display control circuitry, for providing display data elements to the display to refresh each video frame from the first and second inputs of the multiplexer.

24. In a computer system having a display, a processor, and unified memory, a method of refreshing each video frame on the display comprising steps of:

(a) providing pixel data from the processor to a full frame buffer residing in unified memory to form video frames wherein each video frame comprises a plurality of display data elements and each display data element comprises a plurality of pixel data, and wherein each of the plurality of display data elements are independently compressible with respect to each other;

(b) in response to display control circuitry, sending uncompressed display data elements from the full frame buffer to the display;

(c) compressing the uncompressed display data elements when the uncompressed display data elements are sent to the display and storing the compressed display data elements in a compressed frame buffer residing in unified memory;

(d) validating a plurality of valid bits corresponding to the compressed display data elements compressed in step (c); and, (e) so long as the valid bit corresponding to each compressed display data element is valid, on subsequent updates by the display control circuitry, decompressing the compressed display data elements in the compressed frame buffer and sending it to the display and otherwise sending uncompressed display data elements from the full frame buffer to refresh the video frame on the display.

* * * * *